Feb. 13, 1968   R. CASALE ET AL   3,368,919
COMPOSITE PROTECTIVE COAT FOR THIN FILM DEVICES
Filed July 29, 1964

INVENTORS.
JOHN M. WOULBROUN
and RALPH CASALE
BY
ATTORNEY.

3,368,919
COMPOSITE PROTECTIVE COAT FOR
THIN FILM DEVICES
Ralph Casale, Chelmsford, and John M. Woulbroun, Brookline, Mass., assignors to Sylvania Electric Products Inc., a corporation of Delaware
Filed July 29, 1964, Ser. No. 385,991
9 Claims. (Cl. 117—217)

ABSTRACT OF THE DISCLOSURE

A protective overcoating or structure for a thin film device which is impervious to moisture and which also provides a thermal and radiation barrier and mechanically strong, abrasion resistant coating. The protective structure includes a layer of a specified metal formed over and separated from the active device by a layer of an oxide of this metal, and a second oxide layer formed over the outer surface of the metal layer.

This invention relates to thin film devices and to protective thin films therefor.

Thin film devices are generally composed of multiple layers of suitable active materials which cooperate to provide the intended device operation. For example, thin film transistors comprise successive layers of P-type, N-type and P-type material, which, when suitably energized by applied bias signals, provide the intended transistor operation. Another well known thin film device is the thin film capacitor which comprises a film of suitable dielectric material disposed between two electrodes. These thin film devices are by nature very delicate and are particularly susceptible to damage caused by moisture, mechanical handling, and thermal shock. Moisture is especially deleterious since it can diffuse into the thin layers of active material and thereby alter the electrical characteristics of the device, or completely destroy proper device operation. Some means are, therefore, needed to cover or protect these thin film devices. Heretofore, epoxy and other organic resins have been used to overcoat thin film devices in an attempt to protect them from the above-mentioned sources of damage. These resins are not suitable in many cases since they are not impervious to moisture, and are not compatible with the small size of such devices since the resin must be several mils thick to provide the necessary protection. A further disadvantage is that the resins are deposited outside of the vacuum chamber after the device itself is formed, necessitating additional fabrication steps and handling which may cause contamination of the devices.

In accordance with the present invention, a composite protective layer is provided which is impervious to moisture and which also provides a thermal and radiation barrier, as well as a mechanically strong, abrasion resistant coating. The protective layer is deposited within the vacuum chamber in thin film form, and, therefore, does not detract from the inherent small size of thin film devices, nor is device contamination possible since fabrication is accomplished entirely within the controlled environment of the vacuum chamber. Briefly, the protective layer comprises a metal selected from the group consisting of aluminum, chromium, titanium, and tantalum, or alloys thereof, which is deposited in its vapor state over the device being protected and which has an oxide coating formed on its surfaces.

The foregoing will be more fully understood from the following detailed description, taken in conjunction with the drawing, in which.

Figure 1:
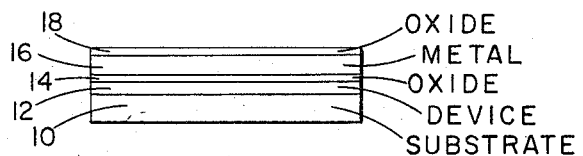
FIG. 1 is a diagrammatic elevation view of a thin film device according to the invention.

Referring to FIG. 1, there is shown a substrate 10 on which is formed a thin film device 12, over which is deposited, in succession, an oxide 14, a metal layer 16, and an oxide layer 18. For simplicity, device 12 is illustrated as a single layer; however, it is to be understood that the device can include a plurality of layers depending, of course, on the nature of the particular device.

Metal layer 16 is essentially a metal of the group consisting of aluminum, chromium, titanium, and tantalum. Alloys of these metals, such as aluminum, chromium, titanium, and tantalum alloyed with gold or Nichrome, can be employed with equal success. Metal layer 16 is deposited over the device by techniques well known in the thin film art, for example, by vapor decomposition, sputtering, or evaporation. Oxide layers 14 and 18 are formed by reacting the depositing metal with oxygen introduced into the vacuum chamber, as is well known. Alternatively, oxide layer 18 could be formed by natural oxidation on the outer surface of metal layer 16 after the device is removed from the vacuum chamber and is exposed to the atmosphere, since metal 16 is readily oxidizable.

Metal layer 16 is impervious to moisture; therefore, moisture is prevented from diffusing into the device being protected. In addition, this metal layer acts as a heat sink to conduct heat from the device. Oxide layer 14 electrically insulates metal layer 16 from the device to prevent short circuiting of the active device layers. Outer oxide coating 18 is resistant to abrasion, chemical attack, and also provides electrical insulation in the event such electrical isolation is necessary in a particular application. Furthermore, oxide layer 18 is resistant to radiation which normally could radiate directly into the device with probable damage thereto. Thin film circuits, protected in accordance with the present invention, could therefore be used in outer space environments without fear of circuit deterioration due to radiation effects. The thickness of metal layer 16 is not critical; however, it should not be so thick that internal stress will cause peeling or cracking of the film. It has been found that a metal thickness of 1000–20,000 angstroms provides the requisite protection while still maintaining the mechanical integrity of the protective layer. Typically, oxide layer 14 is 100–5,000 angstroms thick, while oxide layer 18 is 30–5,000 angstroms thick. It will be noted that the composite protective layer, including metal layer 16 and oxide layers 14 and 18, provides the requisite device protection without detracting from the inherent small size of the thin film device, since the protective layer is itself thin film in form. Furthermore, the protective layer together with the device itself is fabricated entirely within the controlled environment of the vacuum system, thereby minimizing the possibility of device contamination.

Figure 2:
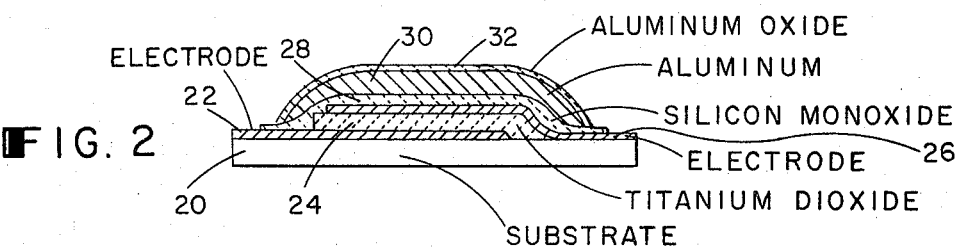
FIG. 2 is a greatly exaggerated elevation view, partly in section, of a thin film capacitor in accordance with the present invention.

A thin film capacitor according to the present invention is illustrated in FIG. 2 and comprises a substrate 20 on which is deposited, in succession, a first electrode 22, a dielectric material 24, a second electrode 26, an insulating oxide layer 28, and a protective metal layer 30 having an oxide coating 32 formed on the upper surface thereof. Dielectrical material 24 typically is titanium dioxide. Electrodes 22 and 26 are typically gold, silver, aluminum or platinum. The capacitance of this device is, of course, dependent upon the dielectric constant of dielectric 24 and the geometry of the capacitor. It is evident that moisture that may enter the device will diffuse into dielectric 24 changing its dielectric constant, with a consequent change in the capacitance. This deleterious result is prevented, according to the invention, by depositing over the device a composite protective coating comprising a metal selected from the group consisting of aluminum, chromium, titanium and tantalum, which metal has an oxide coating formed on its upper and lower surfaces as explained hereinbefore. As seen in FIG. 2, the lower oxide layer 28 electrically insulates metal layer 30 from the device. For high frequency applications, where stray capacitance may be a problem, metal layer 30 can be electrically connected to top electrode 26. Moisture is prevented from diffusing into the device by metal layer 30, while oxide layer 32 affords protection against abrasion, chemical and radiation attack.

The composite metal-oxide coating can be formed by several well known methods. For example, oxide layer 28 can be formed by evaporating one of the specified metals, say silicon, at a temperature of 675–750° C. in an oxygen environment having a partial pressure of about $10^{-4}$ torr. Silicon monoxide is deposited at a rate of 5–10 angstroms/second to the requisite film thickness, typically 100–5,000 angstroms. The oxygen is then pumped out of the vacuum system and aluminum metal is evaporated in a vacuum of $1-9 \times 10^{-6}$ torr to form an aluminum layer 1000–20,000 angstroms thick over the previously formed oxide layer. The outer oxide coating 32 is formed in a similar manner as oxide layer 28, by reaction of aluminum vapor with oxygen, or, alternatively, outer oxide coating 32 can be formed by natural oxidization of aluminum layer 30 after the device is removed from the vacuum chamber and is exposed to the atmosphere.

A particular thin film capacitor, of the type illustrated in FIG. 2, was fabricated on a one inch square glass substrate, as follows: An aluminum electrode 22 was deposited at a substrate temperature of 225° C. in a vacuum of $2 \times 10^{-5}$ torr to a thickness of 750 angstroms. Titanium was then evaporated in an oxygen atmosphere having a partial pressure of $6 \times 10^{-4}$ torr to form an 8,500 angtrom thick titanium dioxide layer 24. A second aluminum electrode 26 was next deposited over layer 24 to a thickness of 750 angstroms, and silicon monoxide then deposited at a pressure of $1 \times 10^{-5}$ torr to form a layer 28 of a thickness of 3,000 angstroms. Aluminum was next evaporated to form a 1,000 angstrom protective layer 30 over the active layers. The device was then removed from the vacuum chamber and exposed to the atmosphere to allow a 30 angstrom aluminum oxide layer 32 to form on the exposed aluminum surface. The capacitor thus formed exhibited a capacitance of .0123 microfarad, a dielectric constant of 280, and a dissipation factor of 2.2 percent.

Figure 3:
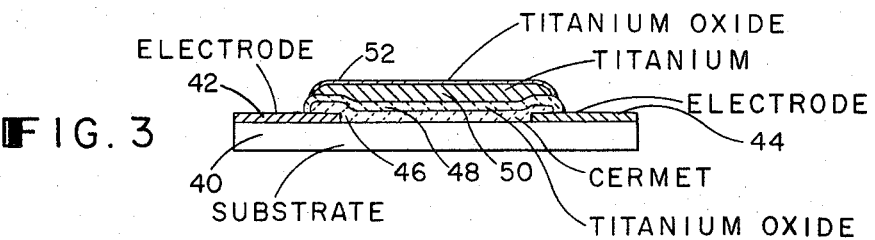
FIG. 3 is a greatly exaggerated elevation view, partly in section, of a thin film resistor according to the invention.

As an example of another thin film device in accordance with the invention, a thin film resistor is illustrated in FIG. 3, including a substrate 40 on which is deposited a pair of electrodes 42 and 44, and a highly resistive material 46, such as an aluminum oxide cermet. Resistive material 46 is in contact at its ends with respective electrodes 42 and 44 to provide the necessary operative connections. An electrically insulating oxide layer 48, for example titanium oxide, is deposited over resistive material 46 to insulate the device from the environment. The metal protective layer 50 is deposited over insulating layer 48, for example titanium, over which is formed outer titanium oxide coating 52. Metal layer 50 is formed, as discussed hereinbefore, by evaporation, vapor decomposition, or sputtering, while oxide layers 48 and 52 are formed in the well known manner by reacting the vaporized metal with oxygen.

From the foregoing it is evident that a composite coating has been provided which is moisture proof, thermally, mechanically and chemically resistant, and which is physically compatible with the small size of thin film devices. Various alternatives will occur to those skilled in the art and still be within the true spirit and scope of the invention. Accordingly, it is not intended to limit the invention to what has been particularly shown and described, except as indicated in the appended claims.

What is claimed is:

1. In a thin film device which includes a substrate having, at least one active layer formed thereon and at least one electrode formed on said substrate and selectively connected to said active layers, a composite protective structure comprising: a layer of a metal selected from the group consisting of aluminum, chromium, titanium and tantalum formed over said active layers and separated therefrom by a first layer of an oxide of said metal, said metal layer having a thickness sufficient to provide a moisture barrier, and a second layer of an oxide of said metal formed on and completely covering the outer surface of said metal.

2. A thin film device comprising a substrate having at least one active layer formed thereon, at least one electrode formed on said substrate and selectively connected to said active layers, and a composite protective structure formed over and completely covering said active layers but not covering end portions of said electrodes, said composite structure including, a first layer of an oxide of a metal selected from the group consisting of aluminum, chromium, titanium and tantalum formed over and completely covering said active layers, a layer of said metal formed over and substantially coextensive with said first oxide layer, and of a thickness sufficient to provide a moisture barrier, and a second layer of an oxide of said metal formed on and completely covering the outer surface of said metal layer and of a sufficient thickness to provide a mechanically strong coat.

3. A thin film capacitor comprising a substrate having a first electrode deposited thereon, a dielectric layer deposited on said substrate and in contact with a portion of said first electrode, a second electrode deposited on said dielectric layer and said substrate, a first oxide layer deposited over and covering said dielectric layer and said electrodes except end portions of said electrodes, a layer of a metal selected from the group consisting of aluminum, chromium, titanium, and tantalum, deposited over said first oxide layer, and a second oxide layer formed over and completely covering said metal layer, said first and second layers of oxide being an oxide of said deposited metal.

4. A thin film capacitor comprising a substrate having a first electrode deposited thereon, a titanium dioxide layer deposited on said substrate and in contact with a portion of said first electrode, a second electrode deposited on said titanium dioxide layer and said substrate, a first aluminum oxide layer deposited over and covering said titanium dioxide and said electrodes except end portions of said electrodes, a layer of aluminum deposited over said first aluminum oxide layer, and a second aluminum oxide layer formed over and completely covering said aluminum layer.

5. A thin film capacitor comprising a substrate having a first electrode deposited thereon, a titanium dioxide layer deposited on said substrate and in contact with a portion of said first electrode, a second electrode deposited on said titanium dioxide layer and said substrate, a first chromium oxide layer deposited over and covering said titanium dioxide and said electrodes except end portions of said electrodes, a layer of chromium deposited over said first chromium oxide layer, and a second chromium oxide layer formed over and completely covering said chromium layer.

6. A thin film capacitor comprising a substrate having a first electrode deposited thereon, a titanium dioxide layer deposited on said substrate and in contact with a portion of said first electrode, a second electrode deposited on said titanium dioxide layer and said substrate, a first titanium oxide layer deposited over and covering said titanium dioxide and said electrodes except end portions of said electrodes, a layer of titanium deposited over said first titanium oxide layer, and a second titanium oxide layer formed over and completely covering said titanium layer.

7. A thin film capacitor comprising a substrate having a first electrode deposited thereon, a titanium dioxide layer deposited on said substrate and in contact with a portion of said first electrode, a second electrode deposited on said titanium dioxide layer and said substrate, a first tantalum oxide layer deposited over and covering said titanium dioxide and said electrodes except end portions of said electrodes, a layer of tantalum deposited over said first tantalum oxide layer, and a second tantalum oxide layer formed over and completely covering said tantalum layer.

8. A thin film resistor comprising a substrate having first and second electrodes formed thereon, a resistive film deposited on said substrate with respective end portions of said resistive film in intimate contact with said first and second electrodes, a first oxide layer deposited over and completely covering said resistive film, a layer of a metal selected from the group consisting of aluminum, chromium, titanium, and tantalum, deposited over and in intimate contact with said first oxide layer but not in contact with said electrodes, and a second oxide layer formed over and completely covering said metal layer, said first and second layers of oxide being an oxide of said deposited metal.

9. A thin film resistor comprising a substrate having first and second electrodes formed thereon, a cermet film deposited on said substrate with respective end portions of said cermet film in intimate contact with said first and second electrodes, a first titanium oxide layer deposited over and completely covering said cermet film, a layer of titanium deposited over and in intimate contact with said first titanium oxide layer but not in contact with said electrodes, and a second titanium oxide layer formed over and completely covering said titanium layer.

References Cited
UNITED STATES PATENTS

| | | | |
|---|---|---|---|
| 2,088,949 | 8/1937 | Fekete. | |
| 3,112,222 | 11/1963 | Alger | 117—217 |
| 3,205,461 | 9/1965 | Anderson | 117—217 X |
| 3,208,873 | 9/1965 | Ames et al. | 117—106 |
| 3,220,880 | 11/1965 | Feursanger | 117—217 |
| 3,254,276 | 5/1966 | Schwarz et al. | 117—200 X |
| 3,256,588 | 6/1966 | Sikina et al. | 117—212 X |
| 3,308,528 | 3/1967 | Bullard et al. | 29—155.62 X |

ALFRED L. LEAVITT, Primary Examiner.

C. K. WEIFFENBACH, Assistant Examiner.